Jan. 20, 1953 E. G. BOICE 2,626,190
TOOL JOINT
Filed Nov. 4, 1949
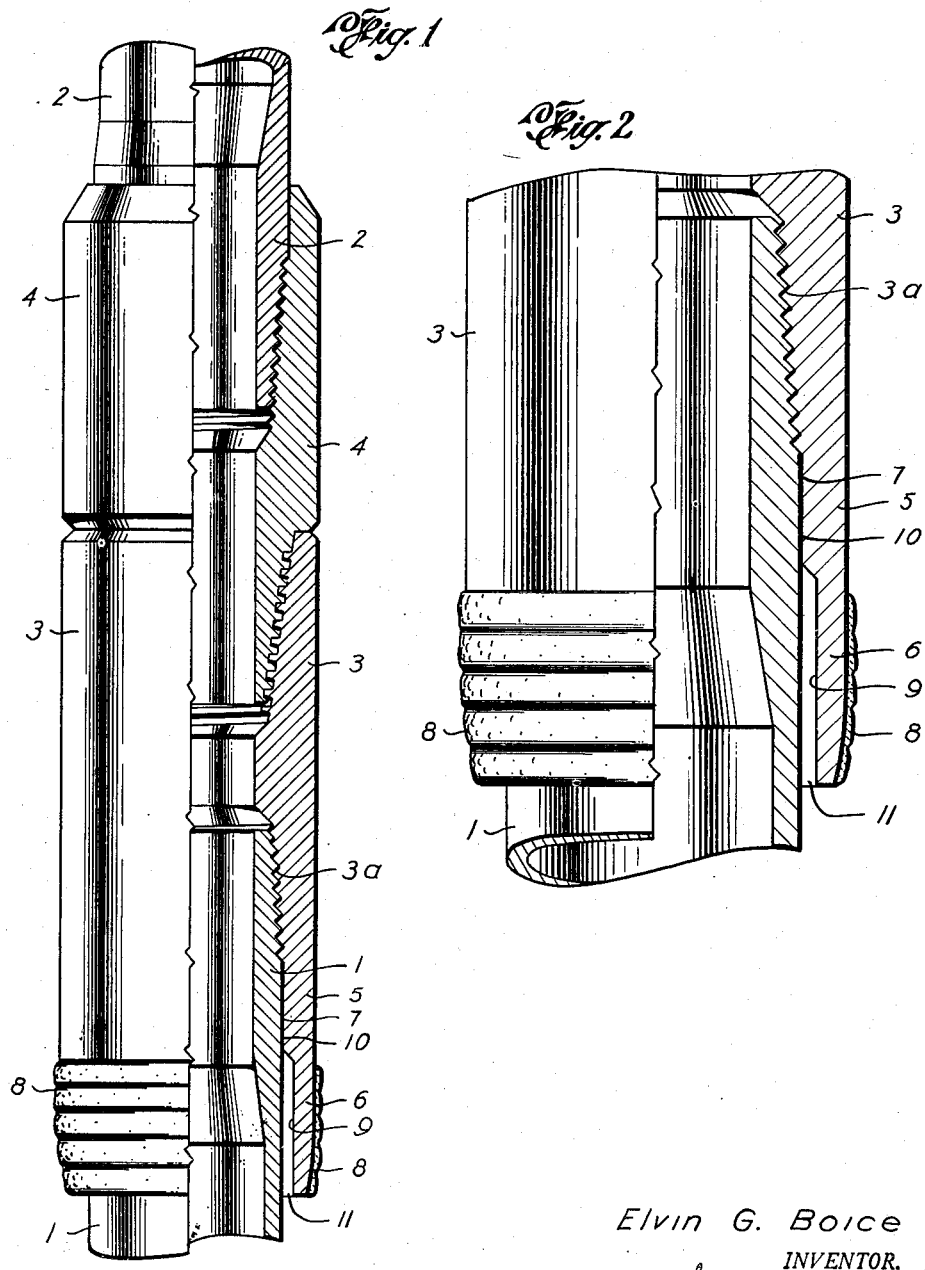
Elvin G. Boice
INVENTOR.
BY Vincent Martin
and
Jos. E. Edwards
ATTORNEY Patented Jan. 20, 1953

2,626,190

UNITED STATES PATENT OFFICE 2,626,190

TOOL JOINT

Elvin G. Boice, Houston, Tex., assignor to Reed Roller Bit Company, Houston, Tex., a corporation of Texas Application November 4, 1949, Serial No. 125,444

6 Claims. (Cl. 308—4)

This invention relates generally to tool joints, and particularly to tool joints for deep well drill stems.

The conventional deep well drill stem comprises a plurality of pipe sections connected together by steel couplings which are known as tool joints.

A commonly used tool joint is the so-called shrink grip tool joint covered by the patent to Childs et al., 2,054,118. This type of tool joint includes internal threads and a shrink grip section to engage, respectively, the threads and land of the pipe.

When the drill stems are rotated in the earth, the tool joints are thereby subjected to the abrasive action of the wall of the hole, and when they are substantially worn, it has been the practice in the field to replace the hard metal on the tool joint by welding additional hard metal on the periphery of the joint at its shrink grip section. The expansion and contraction incident to the welding procedure impairs the connection between the joint and the pipe.

This invention has for one of its specific objects the provision of a new and improved tool joint of the shrink grip type having a portion on which hard metal may be welded without permanently disturbing the connection between the joint and the pipe.

Various other and more general objects will hereinafter appear.

The preferred embodiment of the invention is illustrated in the accompanying drawings in which Fig. 1 is a partly sectional elevation of a complete tool joint connecting two pipe sections and Fig. 2 is a detail partly sectional elevation showing the connecting means of the pipe and joint and the wear-resisting skirt of the latter.

Referring to Fig. 1, portions of the two pipe sections are indicated at 1 and 2, the so-called box member of the joint at 3 and the so-called pin member of the joint at 4.

Referring to Fig. 2, the tool joint member 3 is provided with internal threads 3a, a shrink grip section 5 and a skirt 6.

When tool joints such as the conventional tool joint which includes the shrink grip section 5 become worn in the field, the welding of hard metal on the section 5 disturbs the shrink grip between said section and the land 7 on the pipe 1. The hard metal usually employed includes steel and abrasive material such as tungsten carbide or the like, and it is so applied that it forms a band of steel on the shrink grip section which resists contraction of the shrink grip section 5 after it has been heated by the welding of the hard metal thereon. The connection of the threads 3a may also be impaired.

In accordance with the present invention, the skirt 6 is provided, and the hard metal is welded on the skirt as indicated at 8. The band of steel 8 thus formed will resist the contraction of the sleeve 6 but this will not offer any practical interference with the contraction of the shrink grip section 5, and it will therefore not permanently disturb the shrink grip connection between the section 5 and the pipe 1, or the connection of the threads 3a.

It will be noted that the internal surface 9 of the skirt 6 is at a greater distance from the axis of the body of the tool joint member than is the internal surface 10 of the shrink grip section 5. This provides a space 11 between the skirt 6 and the pipe 1. The skirt 6 may therefore expand and contract without destroying the connection between the shrink grip section 5 of the joint member 3 and the land 7 of the pipe 1, and also without destroying the connection of the threads 3a. The space 11 also prevents the objectionable transfer of heat from the skirt 6 laterally to the pipe 1. When the hard metal 8 is worn away, it may be again replaced by either gas or arc welding without affecting the connection between the joint and pipe.

It will be understood that the connection between the joint member and the pipe in constructions of the type referred to is a sealing connection and it is important to maintain the seal because, during drilling operations, abrasive mud-laden fluid is pumped downwardly through the drill stem, and rises upwardly in the space between the drill stem and the wall of the hole. If the seal is destroyed and this fluid escapes between the pipe and the joint, its abrasive action will soon destroy the joint.

It will be apparent from the foregoing that this invention provides a new and improved tool joint to which wear-resisting hard metal may be applied by either gas or arc welding without affecting the sealing connection between the joint and the pipe.

The invention is not limited to the preferred embodiment herein disclosed. Various changes within the scope of the following claims will be apparent to those skilled in the art.

Having described my invention, I claim:

1. The combination of a pipe and a tool joint member, said pipe having external threads and an external land adjacent said threads, and said member having internal threads and a shrink grip section to engage the threads and the land of said pipe, respectively, an annular skirt extending from said shrink grip section about and spaced from said pipe, and hard metal welded on the outer surface of said skirt.

2. The combination of a pipe and a tool joint member, said pipe having a land, and said member having a shrink grip section engaging said land, said member having an annular skirt extending from said land about and spaced from said pipe, on the outer surface of which skirt wear-resisting material is welded without permanently disturbing the engagement of said shrink grip section and said land.

3. A tool joint member including a body having internal threads, a shrink grip section on said body positioned adjacent to and outwardly from said threads, and an annular skirt extending from said section, the distance between the internal surface of said skirt and the axis of said body being greater than the distance between the internal surface of said shrink grip section and the axis of said body, and hard metal welded on said skirt.

4. A tool joint member including a body having a shrink grip section and a wear-resisting skirt extending from said section, the distance between the internal surface of said skirt and the axis of said body being greater than the distance between the internal surface of said shrink grip section and the axis of said body.

5. In the combination of a pipe and a tool joint having a threaded connection and a shrink fit connection adjacent thereto, the improvement comprising a wear-resisting skirt extending from the shrink fit connection and encircling said pipe in spaced relation thereto.

6. In the combination of a pipe and a tool joint member, the improvement which resides in a wear-resisting portion secured to the tool joint member and spaced from the pipe, and hard wear-resisting metal welded on said wear-resisting portion, the spacing of said wear-resisting portion from said pipe permitting the welding without permanently disturbing the connection between said pipe and said tool joint member.

ELVIN G. BOICE.

REFERENCES CITED

The following references are of record in the file of this patent:

UNITED STATES PATENTS

| Number | Name | Date |
|---|---|---|
| 1,518,960 | Bowser | Dec. 9, 1924 |
| 1,607,941 | Bowser | Nov. 23, 1926 |
| 2,054,118 | Childs | Sept. 15, 1936 |
| 2,334,350 | Neuhaus | Nov. 16, 1943 |
| 2,345,725 | Bettis | Apr. 4, 1944 |
| 2,535,320 | Richardson | Dec. 26, 1950 |